(12) United States Patent
Han

(10) Patent No.: US 8,936,881 B2
(45) Date of Patent: Jan. 20, 2015

(54) RECHARGEABLE LITHIUM BATTERY

(75) Inventor: Su-Hee Han, Yongin-si (KR)

(73) Assignee: Samsung SDI Co., Ltd., Yongin-si, Gyeonggi-do (KR)

( * ) Notice: Subject to any disclaimer, the term of this patent is extended or adjusted under 35 U.S.C. 154(b) by 609 days.

(21) Appl. No.: 13/238,146

(22) Filed: Sep. 21, 2011

(65) Prior Publication Data

US 2012/0202122 A1 Aug. 9, 2012

(30) Foreign Application Priority Data

Feb. 9, 2011 (KR) .......................... 10-2011-0011510

(51) Int. Cl.
*H01M 6/16* (2006.01)
*H01M 10/052* (2010.01)
(Continued)

(52) U.S. Cl.
CPC ............. *H01M 10/052* (2013.01); *H01M 4/505* (2013.01); *H01M 10/0567* (2013.01); *H01M 10/0569* (2013.01); *Y02E 60/122* (2013.01)
USPC ........... 429/326; 429/188; 429/200; 429/324; 429/341

(58) Field of Classification Search
CPC .............. H01M 4/505; H01M 10/052; H01M 10/0569; H01M 10/0567; Y02E 60/122
USPC ........................................................ 429/326
See application file for complete search history.

(56) References Cited

U.S. PATENT DOCUMENTS

| | | | |
|---|---|---|---|
| 6,824,928 B2 | 11/2004 | Arai et al. | |
| 7,235,334 B2 | 6/2007 | Kim et al. | |
| 2005/0287442 A1* | 12/2005 | Kim et al. | ...................... 429/326 |

(Continued)

FOREIGN PATENT DOCUMENTS

| | | |
|---|---|---|
| JP | 2009-187834 A | 8/2009 |
| KR | 10-2001-0082428 A | 8/2001 |

(Continued)

OTHER PUBLICATIONS

Korean Office Action in KR 10-2011-0011510, dated Jan. 23, 2013 (HAN).

*Primary Examiner* — Gary Harris
(74) *Attorney, Agent, or Firm* — Lee & Morse, P.C.

(57) ABSTRACT

A rechargeable lithium battery including a negative electrode, a positive electrode, the positive electrode including a lithium manganese oxide represented by the following Chemical Formula 1a or 1b, and an electrolyte, the electrolyte including an alkylsilyl phosphate represented by the following Chemical Formula 2:

[Chemical Formula 1a]
$$Li_aMnL_bO_2$$

[Chemical Formula 1b]
$$Li_aMn_2L_bO_4$$

[Chemical Formula 2]

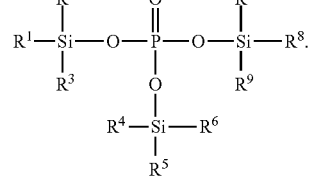

13 Claims, 1 Drawing Sheet

(51) Int. Cl.
*H01M 4/505* (2010.01)
*H01M 10/0567* (2010.01)
*H01M 10/0569* (2010.01)

(56) References Cited

U.S. PATENT DOCUMENTS

2009/0226808 A1 9/2009 Hiwara et al.
2010/0255369 A1 10/2010 Hwang et al.
2011/0059359 A1* 3/2011 Wu et al. ............... 429/211

FOREIGN PATENT DOCUMENTS

| KR | 10-2002-0023145 A | 3/2002 |
| KR | 10-2005-0068669 A | 7/2005 |
| KR | 10 2005-0121172 A | 12/2005 |
| KR | 10-2008-0061692 A | 7/2008 |
| KR | 10-2009-0107436 A | 10/2009 |
| KR | 10 2010-0109709 A | 11/2010 |

* cited by examiner

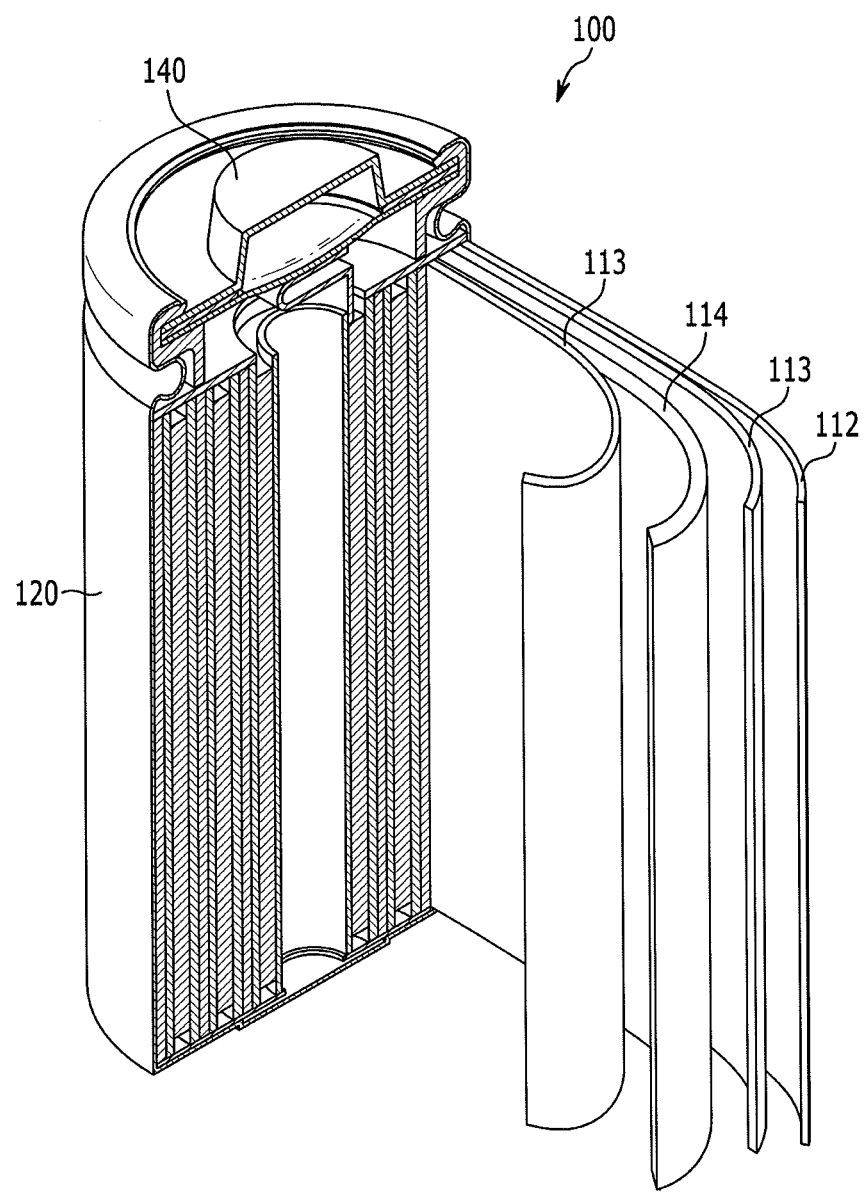

RECHARGEABLE LITHIUM BATTERY

BACKGROUND

1. Field

Embodiments relate to a rechargeable lithium battery.

2. Description of the Related Art

Batteries transform chemical energy (generated by an electrochemical redox reaction of a chemical material in the battery) into electrical energy. Such batteries include a primary battery (which is not rechargeable and should be disposed after the energy inside the battery is consumed), and a rechargeable battery (which may be recharged several times). For example, the rechargeable battery may be charged/discharged several times based on reversible transformation between chemical energy and electrical energy.

Recent development in high-tech electronics industry have allowed electronic devices to become small and light in weight, which has led to an increase in portable electronic devices. As a power source for such portable electronic devices, demands for batteries with high energy density are increasing; and research on lithium rechargeable battery is being conducted.

Rechargeable lithium batteries may be fabricated by injecting electrolyte into a battery cell, which includes a positive electrode including a positive active material capable of intercalating/deintercalating lithium ions and a negative electrode including a negative active material capable of intercalating/deintercalating lithium ions. The positive active material may include lithium manganese oxide (LMO).

SUMMARY

Embodiments are directed to a rechargeable lithium battery.

The embodiments may be realized by providing a rechargeable lithium battery including a negative electrode, a positive electrode, the positive electrode including a lithium manganese oxide represented by the following Chemical Formula 1a or 1b, and an electrolyte, the electrolyte including an alkylsilyl phosphate represented by the following Chemical Formula 2:

$$Li_aMnL_bO_2 \quad \text{[Chemical Formula 1a]}$$

$$Li_aMn_2L_bO_4 \quad \text{[Chemical Formula 1b]}$$

[Chemical Formula 2]

$$\begin{array}{c} R^2 \quad\quad O \quad\quad R^7 \\ | \quad\quad\; \| \quad\quad\; | \\ R^1-Si-O-P-O-Si-R^8 \\ | \quad\quad\; | \quad\quad\; | \\ R^3 \quad\quad O \quad\quad R^9 \\ \quad\quad\;\;\; | \\ \quad\quad R^4-Si-R^6 \\ \quad\quad\quad\;\; | \\ \quad\quad\quad\; R^5 \end{array}$$

wherein, L is one of Al, Cr, Fe, Mg, La, Ce, Sr, V, and a combination thereof, $0.90 \leq a \leq 1.8$, and $0 \leq b \leq 0.1$, and $R^1$ to $R^9$ are each independently a hydrogen or a C1 to C10 alkyl group, provided that at least one of $R^1$ to $R^9$ is a C1 to C10 alkyl group.

The alkylsilyl phosphate may include a trimethylsilyl phosphate represented by the following Chemical Formula 2a:

[Chemical Formula 2a]

$$\begin{array}{c} CH_3 \quad\quad O \quad\quad CH_3 \\ | \quad\quad\;\;\; \| \quad\quad\;\;\; | \\ H_3C-Si-O-P-O-Si-CH_3 \\ | \quad\quad\;\;\; | \quad\quad\;\;\; | \\ CH_3 \quad\quad O \quad\quad CH_3 \\ \quad\quad\quad\;\; | \\ \quad\quad H_3C-Si-CH_3 \\ \quad\quad\quad\quad\; | \\ \quad\quad\quad\quad CH_3 \end{array}$$

$R^1$ to $R^3$ may each independently be a C1 to C10 alkyl group, $R^4$ to $R^6$ may each independently be a C1 to C10 alkyl group, or $R^7$ to $R^9$ may each independently be a C1 to C10 alkyl group.

$R^1$ to $R^9$ may each independently be a C1 to C10 alkyl group.

The alkylsilyl phosphate may be included in the electrolyte in an amount of about 0.5 wt % to about 5 wt %, based on a total weight of the electrolyte.

The electrolyte may further include vinylene carbonate, fluoroethylene carbonate, or a combination thereof.

The vinylene carbonate, the fluoroethylene carbonate, or a combination thereof may be included in the electrolyte in an amount of about 0.5 wt % to about 20 wt %, based on a total weight of the electrolyte.

The rechargeable lithium battery may exhibit a thickness increase ratio of less than about 50% and a remaining capacity retention rate of about 60% or more when allowed to stand at about 60° C. for about 30 days.

The rechargeable lithium battery may exhibit an IR increase ratio of about 40% or less when allowed to stand at about 60° C. for about 30 days.

The rechargeable lithium battery may exhibit a thickness increase ratio of about 20% or less and a remaining capacity retention of 80% or more when allowed to stand at about 60° C. for about 30 days.

The rechargeable lithium battery may exhibit an IR increase ratio of about 30% or less when allowed to stand at about 60° C. for about 30 days.

The electrolyte may further include a non-aqueous organic solvent and a lithium salt.

The non-aqueous organic solvent may include a carbonate-based solvent, an ester-based solvent, an ether-based solvent, a ketone-based solvent, an alcohol-based solvent, an aprotic solvent, or a combination thereof.

BRIEF DESCRIPTION OF THE DRAWING

The embodiments will become more apparent to those of ordinary skill in the art by describing in detail exemplary embodiments with reference to the attached drawing, in which:

FIG. 1 illustrates a schematic view of a rechargeable lithium battery according to an embodiment.

DETAILED DESCRIPTION

Korean Patent Application No. 10-2011-0011510, filed on Feb. 9, 2011, in the Korean Intellectual Property Office, and entitled: "Rechargeable Lithium Battery," is incorporated by reference herein in its entirety.

Example embodiments will now be described more fully hereinafter with reference to the accompanying drawing; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another element, it can be directly on the other element, or intervening elements may also be present. In addition, it will also be understood that when an element is referred to as being "between" two elements, it can be the only element between the two elements, or one or more intervening elements may also be present. Like reference numerals refer to like elements throughout.

Referring to FIG. 1, a rechargeable lithium battery according to an embodiment will be described.

FIG. 1 illustrates a schematic view of a rechargeable lithium battery according to an embodiment.

Referring to FIG. 1, the rechargeable lithium battery 100 may include a battery cell including a positive electrode 114, a negative electrode 112 (facing the positive electrode 114), a separator 113 (interposed between the positive electrode 114 and the negative electrode 112), an electrolyte solution (not illustrated) impregnating the positive electrode 114, negative electrode 112, and separator 113, a battery case 120, and a sealing member 140 (sealing the battery case 120).

The positive electrode 114 may include a current collector and a positive active material layer on the current collector. The current collector may include, e.g., aluminum foil, but the embodiments are not limited thereto. The positive active material layer may include, e.g., a positive active material, a binder, and a conductive material. In an implementation, the positive active material may include a lithium manganese oxide (LMO), e.g., a compound being capable of reversibly intercalating and deintercalating lithium ions.

The lithium manganese oxide may be represented by, e.g., the following Chemical Formula 1a or 1b.

  [Chemical Formula 1a]

  [Chemical Formula 1b]

In Chemical Formulae 1a and 1b, L may include, e.g., Al, Cr, Fe, Mg, La, Ce, Sr, V, and/or a combination thereof, $0.90 \leq a \leq 1.8$, and $0 \leq b \leq 0.1$.

The binder may improve properties of binding positive active material particles with one another as well as binding of the positive active material with the current collector. Examples of the binder may include polyvinyl alcohol, carboxylmethyl cellulose, hydroxypropyl cellulose, diacetyl cellulose, polyvinyl chloride, carboxylated polyvinyl chloride, polyvinylfluoride, polymer including ethylene oxide, polyvinylpyrrolidone, polyurethane, polytetrafluoroethylene, polyvinylidene fluoride, polyethylene, polypropylene, poly(vinylidenefluoride-hexafluoropropylene), a styrene-butadiene rubber, an acrylated styrene-butadiene rubber, an epoxy resin, nylon, and the like, but are not limited thereto.

The conductive material may improve electrode conductivity. Any electrically conductive material that does not cause a chemical change may be used as the conductive material. In an implementation, the conductive material may include, e.g., a carbon-based material such as natural graphite, artificial graphite, carbon black, acetylene black, ketjen black, a carbon fiber, and the like; a metal-based material of a metal powder or a metal fiber including copper, nickel, aluminum, silver, and the like; a conductive polymer such as a polyphenylene derivative; or a mixture thereof.

The separator 113 may be a single layer or multilayer, and may be made of, e.g., polyethylene, polypropylene, polyvinylidene fluoride, or combinations thereof.

The negative electrode 112 may include a current collector and a negative active material layer on the current collector. The current collector may include, e.g., a copper foil, a nickel foil, a stainless steel foil, a titanium foil, a nickel foam, or a polymer substrate coated with conductive metals, but the embodiments are not limited thereto. The negative active material layer may include a negative active material, a binder, and a conductive material. The negative active material may include a compound that reversibly intercalates/deintercalates lithium ions, a lithium metal, a lithium metal-containing alloy, a material being capable of doping and dedoping lithium, or transition metal oxide.

The compound that reversibly intercalates/deintercalates lithium ion carbon material may include any suitable carbon-based negative active material generally used in a lithium ion secondary battery, e.g., crystalline carbon, amorphous carbon, or a combination thereof. The crystalline carbon may be non-shaped, or sheet, flake, spherical, or fiber shaped natural graphite or artificial graphite. The amorphous carbon may be a soft carbon, a hard carbon, mesophase pitch carbonized products, fired coke, and so on.

The lithium metal-containing alloy may include lithium and a metal, e.g., Na, K, Rb, Cs, Fr, Be, Mg, Ca, Sr, Si, Sb, Pb, In, Zn, Ba, Ra, Ge, Al, or Sn.

The material capable of doping and dedoping lithium may include, e.g., Si, $SiO_x$, ($0<x<2$), a Si-Q alloy (wherein Q is an alkali metal, an alkali-earth metal, Group 13 to Group 16 elements, a transition element, a rare earth element, or a combination thereof, and not Si), Sn, $SnO_2$, a Sn—R alloy (wherein R is an alkali metal, an alkali-earth metal, Group 13 to Group 16 elements, a transition element, a rare earth element, or a combination thereof, and not Sn). At least one of the materials may be mixed with $SiO_2$. Herein, Q and R may each be an element including, e.g., Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, or a combination thereof.

The transition metal oxide may include, e.g., vanadium oxide, lithium vanadium oxide, and the like.

The binder may improve properties of binding active material particles with one another as well as the negative active material with the current collector. The binder includes a non-water-soluble binder, a water-soluble binder, or a combination thereof.

The non-water-soluble binder includes polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, polyamideimide, polyimide, or a combination thereof.

The water-soluble binder includes, for example, a styrene-butadiene rubber, an acrylated styrene-butadiene rubber, polyvinyl alcohol, sodium polyacrylate, a copolymer including propylene and a $C_2$ to $C_8$ olefin, a copolymer of (meth)acrylic acid and (meth)acrylic acid alkyl ester, or a combination thereof.

When the water-soluble binder is used as a negative electrode binder, a cellulose-based compound may be further used to provide viscosity. The cellulose-based compound includes one or more of carboxylmethyl cellulose, hydroxypropylmethyl cellulose, methyl cellulose, or alkaline metal salts thereof. The alkaline metal may be Na, K, or Li. The cellulose-based compound may be included in an amount of 0.1 to 3 parts by weight based on 100 parts by weight of the negative active material.

The negative active material composition may further include a solvent, and examples of the solvent include N-methylpyrrolidone, or water and the like, but are not limited thereto.

The conductive material may improve electrode conductivity. Any electrically conductive material that does not cause a chemical change may be used as the conductive material. In an implementation, the conductive material may include, e.g., a carbon-based material such as natural graphite, artificial graphite, carbon black, acetylene black, ketjen black, a carbon fiber, and the like; a metal-based material of a metal powder or a metal fiber including copper, nickel, aluminum, silver, and the like; a conductive polymer such as a polyphenylene derivative, or a mixture thereof.

The electrolyte may include, e.g., a non-aqueous organic solvent, a lithium salt, and an additive.

The non-aqueous organic solvent may serve as a medium for transmitting ions taking part in the electrochemical reaction of a battery. The non-aqueous organic solvent may include, e.g., a carbonate-based, ester-based, ether-based, ketone-based, alcohol-based, aprotic solvent or a combination thereof.

Examples of the carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and the like.

Among these, when a linear carbonate compound and a cyclic carbonate compound are mixed together, the mixed solvent may have a higher dielectric constant but also a low viscosity. In an implementation, the cyclic carbonate compound and the linear carbonate compound may be mixed in a volume ratio of about 1:1 to about 1:9.

Examples of the ester-based solvent may include methyl acetate, ethyl acetate, n-propyl acetate, dimethylacetate, methylpropionate, ethylpropionate, γ-butyrolactone, decanolide, valerolactone, mevalonolactone, caprolactone, and the like.

Examples of the ether-based solvent may include dibutyl ether, tetraglyme, diglyme, dimethoxyethane, 2-methyltetrahydrofuran, tetrahydrofuran, and the like. Examples of the ketone-based solvent may include cyclohexanone and the like.

Examples of the alcohol-based solvent may include ethyl alcohol, isopropyl alcohol, and the like.

Examples of the aprotic solvent may include nitriles such as R—CN (where R is a C2 to C20 linear, branched, or cyclic hydrocarbon, a double bond, an aromatic ring, or an ether bond), amides such as dimethylformamide, dioxolanes such as 1,3-dioxolane, sulfolanes, and the like.

The non-aqueous organic solvent may be used singularly or in a mixture of two or more thereof. When the organic solvent is used in a mixture, the mixture ratio may be controlled in accordance with a desired battery performance.

The lithium salt may be dissolved in an organic solvent and may play a role of supplying lithium ions in the battery, facilitating a basic operation of the rechargeable lithium battery, and improving lithium ion transportation between positive and negative electrodes therein.

Examples of the lithium salt may include at least one supporting salt, e.g., $LiPF_6$, $LiBF_4$, $LiSbF_6$, $LiAsF_6$, $LiC_4F_9SO_3$, $LiClO_4$, $LiAlO_2$, $LiAlCl_4$, $LiN\ (C_xF_{2x+1}SO_2)(C_yF_{2y+1}SO_2)$ (x and y are natural numbers), LiCl, LiI, $LiB(C_2O_4)_2$ (lithium bis(oxalato)borate; LiBOB), or a combination thereof.

The lithium salt may be used in a concentration of about 0.1 M to about 2.0 M. When the lithium salt is included in the above concentration range, the electrolyte may have excellent performance and lithium ion mobility due to optimal electrolyte conductivity and viscosity.

The additive may include an alkylsilyl phosphate, e.g., a trialkylsilyl phosphate.

The alkylsilyl phosphate may be represented by the following Chemical Formula 2.

[Chemical Formula 2]

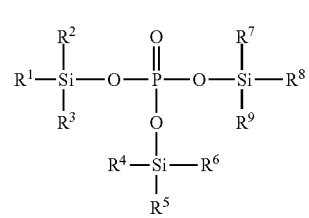

In Chemical Formula 2, $R^1$ to $R^9$ may each independently be hydrogen or a C1 to C10 alkyl group, whereat least one of $R^1$ to $R^9$ is a C1 to C10 alkyl group. In an implementation, at least three of $R^1$ to $R^9$ may be a C1 to C10 alkyl group. In another implementation, $R^1$ to $R^3$ may be a C1 to C10 alkyl group, $R^4$ to $R^6$ may be a C1 to C10 alkyl group, and/or $R^7$ to $R^9$ may be a C1 to C10 alkyl group. In yet another implementation, $R^1$ to $R^9$ may be a C1 to C10 alkyl group, e.g., the alkylsilyl phosphate may be tris(trialkylsilyl)phosphate.

The trialkylsilyl phosphate may be, e.g., trimethylsilyl phosphate.

The trimethylsilyl phosphate may be represented by the following Chemical Formula 2a, e.g., the trimethylsilyl phosphate may be tris(trimethylsilyl)phosphate.

[Chemical Formula 2a]

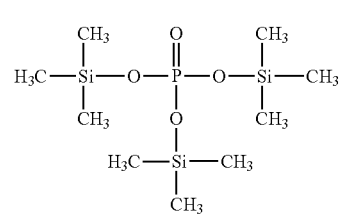

The electrolyte may include the alkylsilyl phosphate and, accordingly, volume expansion of the positive electrode may be decreased when a battery is stored at a high temperature. Thus, a thickness increase of the battery may be prevented. The battery stability at a high temperature may prevent output deterioration of the battery and may maintain its capacity retention.

The alkylsilyl phosphate may be included in an amount of about 0.5 wt % to about 5 wt %, based on a total weight of the electrolyte. When the alkylsilyl phosphate is included within this range, the electrolyte may help ensure battery stability at a high temperature while maintaining a low viscosity.

The electrolyte may further include vinyl carbonate (VC), fluoroethylene carbonate (FEC), or a combination thereof.

The vinylene carbonate and the fluoroethylene carbonate may improve battery cycle characteristics at a high temperature and thus, may increase cycle-life of a battery.

The vinylene carbonate, fluoroethylene carbonate, or combination thereof may be included in an amount of about 0.5 wt % to about 20 wt %, based on the total weight of the electrolyte. When the vinylene carbonate, fluoroethylene carbonate, or combination thereof is included within this range, the electrolyte may ensure good cycle characteristics at a high temperature and may also prevent a thickness increase of the battery at a high temperature when lithium manganese oxide is used as the positive active material.

The electrolyte may include other additives, e.g., an overcharge preventive such as ethylene carbonate and pyrocarbonate.

The following Examples and Comparative Examples are provided in order to set forth particular details of one or more embodiments. However, it will be understood that the embodiments are not limited to the particular details described. Further, the Comparative Examples are set forth to highlight certain characteristics of certain embodiments, and are not to be construed as either limiting the scope of the invention as exemplified in the Examples or as necessarily being outside the scope of the invention in every respect.

Fabrication of a Rechargeable Lithium Battery

Example 1

90 wt % of $LiMn_2O_4$, 5 wt % of poly(vinylidenefluoride-hexafluoropropylene) (P(VdF-HFP)), and 5 wt % of acetylene black in N-methylpyrrolidone were mixed to prepare positive electrode slurry. The positive electrode slurry was used to fabricate a positive electrode.

90 wt % of graphite as a negative active material, 5 wt % of polyvinylidene fluoride, and 5 wt % of carbon in N-methylpyrrolidone were mixed to prepare negative electrode slurry. The negative electrode slurry was used to fabricate a negative electrode.

The positive electrode, the negative electrode, a film made of a polyethylene material as a separator, and an electrolyte (described below) were used to fabricate a battery cell. The electrolyte was prepared by mixing ethylene carbonate (EC):ethylmethyl carbonate (EMC):dimethyl carbonate (DMC) in a weight ratio of 1:1:1 and then forming a 1 M solution of $LiPF_6$ in the mixed solvent. Then, 1 wt % of tris(trimethylsilyl) phosphate, as an additive, was added thereto.

Example 2

A rechargeable lithium battery cell was fabricated according to the same method as Example 1 except for using 0.5 wt % of tris(trimethylsilyl) phosphate instead of 1 wt % of tris(trimethylsilyl) phosphate in the electrolyte.

Example 3

A rechargeable lithium battery cell was fabricated according to the same method as Example 1 except for using 3 wt % of tris(trimethylsilyl) phosphate instead of 1 wt % of tris(trimethylsilyl) phosphate in the electrolyte.

Example 4

A rechargeable lithium battery cell was fabricated according to the same method as Example 1 except for using 5 wt % of tris(trimethylsilyl) phosphate instead of 1 wt % of tris(trimethylsilyl) phosphate in the electrolyte.

Example 5

A rechargeable lithium battery cell was fabricated according to the same method as Example 1 except for using 0.5 wt % of tris(trimethylsilyl) phosphate instead of 1 wt % of tris(trimethylsilyl) phosphate in an electrolyte and adding 0.5 wt % of vinylene carbonate thereto in the electrolyte.

Example 6

A rechargeable lithium battery cell was fabricated according to the same method as Example 1 except for using 3 wt % of tris(trimethylsilyl) phosphate instead of 1 wt % of tris(trimethylsilyl) phosphate in an electrolyte and adding 5.0 wt % of vinylene carbonate thereto in the electrolyte.

Example 7

A rechargeable lithium battery cell was fabricated according to the same method as Example 1 except for further including 1 wt % of vinylene carbonate in the electrolyte.

Example 8

A rechargeable lithium battery cell was fabricated according to the same method as Example 1 except for using 5 wt % of tris(trimethylsilyl) phosphate instead of 1 wt % of tris(trimethylsilyl) phosphate and further including 20 wt % of vinylene carbonate in the electrolyte.

Example 9

A rechargeable lithium battery cell was fabricated according to the same method as Example 1 except for using 0.5 wt % of tris(trimethylsilyl) phosphate instead of 1 wt % of tris(trimethylsilyl) phosphate and further including 0.5 wt % of fluoroethylene carbonate in the electrolyte.

Example 10

A rechargeable lithium battery cell was fabricated according to the same method as Example 1 except for using 3 wt % of tris(trimethylsilyl) phosphate instead of 1 wt % of tris(trimethylsilyl) phosphate and further including 5 wt % of fluoroethylene carbonate in the electrolyte.

Example 11

A rechargeable lithium battery cell was fabricated according to the same method as Example 1 except for using 5 wt % of tris(trimethylsilyl) phosphate instead of 1 wt % of tris(trimethylsilyl) phosphate and further including 20 wt % of fluoroethylene carbonate in the electrolyte.

Example 12

A rechargeable lithium battery cell was fabricated according to the same method as Example 1 except for using 0.5 wt % of tris(trimethylsilyl) phosphate instead of 1 wt % of tris(trimethylsilyl) phosphate and further including 0.5 wt % of vinylene carbonate and 0.5 wt % of fluoroethylene carbonate in the electrolyte.

Example 13

A rechargeable lithium battery cell was fabricated according to the same method as Example 1 except for using 3 wt % of tris(trimethylsilyl) phosphate instead of 1 wt % of tris(trimethylsilyl) phosphate and further including 5 wt % of vinylene carbonate and wt % of fluoroethylene carbonate in the electrolyte.

Example 14

A rechargeable lithium battery cell was fabricated according to the same method as Example 1 except for using 5 wt % of tris(trimethylsilyl) phosphate instead of 1 wt % of tris(trimethylsilyl) phosphate and further including 5 wt % of vinylene carbonate and wt % of fluoroethylene carbonate in the electrolyte.

Example 15

A rechargeable lithium battery cell was fabricated according to the same method as Example 1 except for using 0.2 wt % of tris(trimethylsilyl) phosphate instead of 1 wt % of tris(trimethylsilyl) phosphate in the electrolyte.

Example 16

A rechargeable lithium battery cell was fabricated according to the same method as Example 1 except for using 0.3 wt % of tris(trimethylsilyl) phosphate instead of 1 wt % of tris(trimethylsilyl) phosphate in the electrolyte.

Example 17

A rechargeable lithium battery cell was fabricated according to the same method as Example 1 except for using 7 wt % of tris(trimethylsilyl) phosphate instead of 1 wt % of tris(trimethylsilyl) phosphate in the electrolyte.

Example 18

A rechargeable lithium battery cell was fabricated according to the same method as Example 1 except for using 10 wt % of tris(trimethylsilyl) phosphate instead of 1 wt % of tris(trimethylsilyl) phosphate in the electrolyte.

Comparative Example 1

A rechargeable lithium battery cell was fabricated according to the same method as Example 1 except for using $LiCoO_2$ instead of $LiMn_2O_4$ as a positive active material and no tris(trimethylsilyl) phosphate in the electrolyte.

Comparative Example 2

A rechargeable lithium battery cell was fabricated according to the same method as Example 1 except for using $LiCoO_2$ instead of $LiMn_2O_4$ as a positive active material.

Comparative Example 3

A rechargeable lithium battery cell was fabricated according to the same method as Example 1 except for including no tris(trimethylsilyl) phosphate in the electrolyte.

Evaluation

The rechargeable lithium battery cells according to Examples 1 to 18 and Comparative Examples 1 to 3 were evaluated regarding high temperature stability and output and capacity maintenance characteristics due to the stability at a high temperature.

The high temperature stability, output, and capacity maintenance characteristics were evaluated by allowing the rechargeable lithium battery cells according to Examples 1 to 18 and Comparative Examples 1 to 3 to stand at about 60° C. for about 30 days and measuring a thickness increase ratio against an initial thickness thereof, IR increase ratio, and a remaining capacity ratio against an initial capacity thereof.

The results are provided in the following Table 1.

TABLE 1

| | Thickness increase ratio (%) | IR increase ratio (%) | Retention ratio of Remaining capacity (%) |
|---|---|---|---|
| Example 1 | 10 | 10 | 83 |
| Example 2 | 13 | 11 | 80 |
| Example 3 | 7 | 8 | 84 |
| Example 4 | 8 | 8 | 81 |
| Example 5 | 13 | 14 | 82 |
| Example 6 | 15 | 17 | 85 |
| Example 7 | 9 | 9 | 86 |
| Example 8 | 18 | 24 | 87 |
| Example 9 | 13 | 12 | 80 |
| Example 10 | 16 | 14 | 81 |
| Example 11 | 18 | 17 | 80 |
| Example 12 | 12 | 14 | 81 |
| Example 13 | 17 | 18 | 86 |
| Example 14 | 20 | 21 | 82 |
| Example 15 | 41 | 27 | 64 |
| Example 16 | 32 | 24 | 73 |
| Example 17 | 38 | 17 | 81 |
| Example 18 | 49 | 35 | 80 |
| Comparative Example 1 | 12 | 75 | 94 |
| Comparative Example 2 | 11 | 70 | 94 |
| Comparative Example 3 | 64 | 158 | 44 |

Referring to Table 1, when the rechargeable lithium battery cells according to Examples 1 to 18 were allowed to stand at about 60° C. for about 30 days, the cells exhibited a desirably low thickness increase ratio and IR increase ratio as well as a good retention rate of remaining capacity. Specifically, the cells had a thickness increase ratio of less than about 50%, an IR increase ratio of about 40% or less, and retention rate of remaining capacity of about 60% or more. In particular, the rechargeable lithium battery cells according to Examples 1 to 14 had a thickness increase ratio of about 20% or less, an IR increase ratio of about 30% or less, and a retention rate of remaining capacity of about 80% or more when allowed to stand at about 60° C. for about 30 days.

On the contrary, the cells including lithium cobalt oxide (LCO) as a positive active material (according to Comparative Examples 1 and 2) exhibited a remarkably high IR increase ratio regardless of the presence of electrolyte additives and thus, did not exhibit good output characteristics at a high temperature. The cell including lithium manganese oxide (LMO) as a positive active material and including no trimethylsilyl phosphate in the electrolyte (according to Comparative Example 3) exhibited a high thickness increase ratio and IR increase ratio as well as poor retention rate of remaining capacity at a high temperature.

By way of summation and review, lithium manganese oxide may be structurally stable. Thus, the lithium manganese oxide may not have a large heating value and may exhibit excellent cycle-life characteristics. However, when lithium manganese oxide is used as a positive active material, a volume of the positive active material may expand at a high temperature and thus, may increase a thickness of a positive electrode. This thickness increase may not only undesirably transform a battery shape but may also deteriorate battery output and capacity.

The embodiments provide a rechargeable lithium battery having increased high temperature stability without an adverse influence on battery characteristics when lithium manganese oxide is used as a positive active material.

Accordingly, the electrolyte of an embodiment facilitates suppression of volume expansion of a rechargeable lithium battery and external transformation of the battery. Thus, battery output and capacity characteristics are improved.

Example embodiments have been disclosed herein, and although specific terms are employed, they are used and are to be interpreted in a generic and descriptive sense only and not for purpose of limitation. Accordingly, it will be understood by those of skill in the art that various changes in form and details may be made without departing from the spirit and scope of the present invention as set forth in the following claims.

What is claimed is:

1. A rechargeable lithium battery, comprising: a negative electrode, a positive electrode, the positive electrode including a lithium manganese oxide represented by the following Chemical Formula 1a or 1b, and an electrolyte, the electrolyte including an alkylsilyl phosphate represented by the following Chemical Formula 2:

$Li_aMnL_bO_2$  [Chemical Formula 1a]

$Li_aMn_zL_bO_4$  [Chemical Formula 1b]

[Chemical Formula 2]

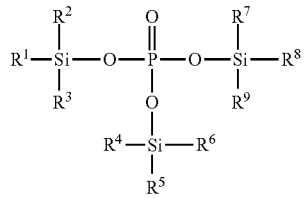

wherein, L is one of Al, Cr, Fe, Mg, La, Ce, Sr, V, and a combination thereof, $0.90 \leq a \leq 1.8$, and $0 \leq b \leq 0.1$, and R1 to R9 are each independently a hydrogen or a C1 to C10 alkyl group, provided that at least one of $R^1$ to $R^9$ is a C1 to C10 alkyl group;

wherein, the alkylsilyl phosphate is included in the electrolyte in an amount of 3 wt % to about 5 wt %, based on a total weight of the electrolyte.

2. The rechargeable lithium battery as claimed in claim 1, wherein the alkylsilyl phosphate includes a trimethylsilyl phosphate represented by the following Chemical Formula 2a:

[Chemical Formula 2a]

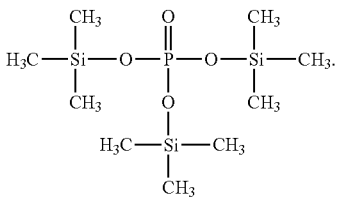

3. The rechargeable lithium battery as claimed in claim 1, wherein $R^1$ to $R^3$ are each independently a C1 to C10 alkyl group, $R^4$ to $R^6$ are each independently a C1 to C10 alkyl group, or $R^7$ to $R^9$ are each independently a C1 to C10 alkyl group.

4. The rechargeable lithium battery as claimed in claim 3, wherein $R^1$ to $R^9$ are each independently a C1 to C10 alkyl group.

5. The rechargeable lithium battery as claimed in claim 1, wherein the alkylsilyl phosphate is included in the electrolyte in an amount of about 0.5 wt % to about 5 wt %, based on a total weight of the electrolyte.

6. The rechargeable lithium battery as claimed in claim 1, wherein the electrolyte further includes vinylene carbonate, fluoroethylene carbonate, or a combination thereof.

7. The rechargeable lithium battery as claimed in claim 6, wherein the vinylene carbonate, the fluoroethylene carbonate, or a combination thereof is included in the electrolyte in an amount of about 0.5 wt % to about 20 wt %, based on a total weight of the electrolyte.

8. The rechargeable lithium battery as claimed in claim 1, wherein the rechargeable lithium battery exhibits a thickness increase ratio of less than about 50% and a remaining capacity retention rate of about 60% or more when allowed to stand at about 60° C. for about 30 days.

9. The rechargeable lithium battery as claimed in claim 8, wherein the rechargeable lithium battery exhibits an internal resistance increase ratio of about 40% or less when allowed to stand at about 60° C. for about 30 days.

10. The rechargeable lithium battery as claimed in claim 1, wherein the rechargeable lithium battery exhibits a thickness increase ratio of about 20% or less and a remaining capacity retention of 80% or more when allowed to stand at about 60° C. for about 30 days.

11. The rechargeable lithium battery as claimed in claim 8, wherein the rechargeable lithium battery exhibits an internal resistance increase ratio of about 30% or less when allowed to stand at about 60° C. for about 30 days.

12. The rechargeable lithium battery as claimed in claim 1, wherein the electrolyte further includes a non-aqueous organic solvent and a lithium salt.

13. The rechargeable lithium battery as claimed in claim 12, wherein the non-aqueous organic solvent includes a carbonate-based solvent, an ester-based solvent, an ether-based solvent, a ketone-based solvent, an alcohol-based solvent, an aprotic solvent, or a combination thereof.

* * * * *